Dec. 10, 1968  
C. C. PERRY  
3,416,112  
ELECTRIC HEATER CONTROL APPARATUS UTILIZING  
TEMPERATURE RESPONSIVE LEVER  
Filed July 5, 1966

INVENTOR  
CHARLES C. PERRY

BY Olsen and Stephenson  
ATTORNEYS

United States Patent Office 3,416,112
Patented Dec. 10, 1968

3,416,112
ELECTRIC HEATER CONTROL APPARATUS UTILIZING TEMPERATURE RESPONSIVE LEVER
Charles C. Perry, Ann Arbor, Mich., assignor to W. M. Chace Company, Detroit, Mich., a corporation of Delaware
Filed July 5, 1966, Ser. No. 562,785
7 Claims. (Cl. 337—40)

ABSTRACT OF THE DISCLOSURE

Electric space heater control apparatus in which a thermostatic bimetal element and a temperature responsive lever coact to control an "on-off" switch for the heater so as to sense the heat loss rate from the space and produce an equal generation rate. The temperature responsive lever is adjustably mounted and deflects, when it cools, in a direction to close the heater switch. When the heater switch is closed, an electric resistance heater for the bimetal element is energized to heat the element resulting in deflection of the element in a direction resulting in opening of the space heater switch.

---

This invention relates generally to thermal controls and more particularly to an improved electric heater control apparatus which senses the heat loss rate from the controlled space and produces an equal heat generation rate.

The improved heater control apparatus of this invention is applicable to the heating of enclosures where negligible temperature fluctuation is important. It is described herein with particular reference to room heating, where it provides greatly enhanced comfort, only for illustrative purposes. The conventional room thermostat for controlling room temperature sits dormant, with the space heater cold, until the temperature in the thermostat-controlled room drops sufficiently below the set temperature to actuate a switch for turning on the heater. The heater then remains on at full heat until the temperature rises sufficiently above the set point to open the switch again. The difference between the lower temperature at which the heater is turned on, and the upper temperature at which the heater is turned off is known as the "temperature differential" of the thermostat, and is a thermostat operating parameter which designers always attempt to minimize. A zero differential is the ultimate ideal, but the thermostat designer can never reach this condition, nor can he approach it as closely as he wishes. Thus, in the case of the conventional thermostat, the space heater fluctuates between full heat generation and the cold state, and produces undesirably large fluctuations in the temperature of the controlled room.

It is an object of this invention, therefore, to provide an improved electric heater control apparatus which overcomes the above-described disadvantages inherent in conventional thermostat apparatus by sensing the heat loss rate from the controlled space and continuously providing a heat generation rate equal to the heat loss rate.

In the improved control apparatus of this invention, the heater cycles off and on continually at a rate such that the temperature fluctuations in the controlling space are imperceptible since the heater never reaches either the full heat generation rate or the cold state. Instead the heater displays a very small oscillation about an average value which is automatically equal to the average heat loss rate from the controlled space. For this reason the apparatus of this invention is preferably mounted on or partially inside of an outer or other cold wall of the room so as to sense, through the temperature gradient at the wall, the heat loss rate from the controlled space.

Further objects, features and advantages of this invention will become apparent from a consideration of the following description, the appended claims, and the accompanying drawing in which:

Figure 1:
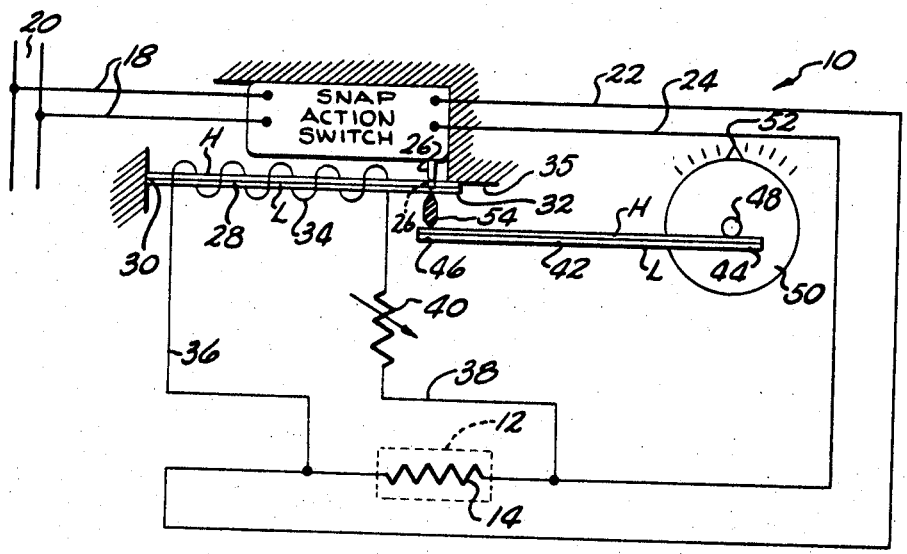
FIGURE 1 is a diagrammatic view illustrating the control apparatus of this invention in assembly relation with an electric heater.

With reference to the drawing, the electric heater control apparatus of this invention, indicated generally at 10, is illustrated in FIG. 1 connected to an electric heater 12 which includes a resistance element 14. The apparatus 10 includes a snap action switch 16 connected by conductors 18 to a source of current indicated generally at 20 and connected by leads 22 and 24 to opposite ends of the resistance element 14. The snap action switch 16 is of conventional "on-off" construction and includes an actuating member 26 which is biased to the switch "off" position illustrated in broken lines in FIG. 1. The actuating member 26 is movable upwardly as viewed in FIG. 1 to a switch "on" position shown in solid lines. A thermostatic bimetal element 28 is fixedly mounted at one end 30 so that the opposite end 32 will deflect in response to heating and cooling of the element 28. An electric resistance coil 34 is coiled about the element 28 for heating the element 28 to produce deflection of the end 32 thereof. It is to be understood that the element 28 is ambient temperature compensated by any of the several well known and conventional methods so that the element 28 will not deflect in response to changes in temperature in the ambient atmosphere, but will deflect only in response to heating by the coil 34. Accordingly, in actual practice the element 28 will not look like it is depicted in FIG. 1 wherein it is shown more or less diagrammatically for purposes of simplicity. The element 28 has a high expanding side H and a low expanding side L so that when it is heated by the coil 34, which can be disposed adjacent the high side H as well as being coiled about the element 28, the end 32 of the element 28 will deflect in a downward direction away from the switch actuating member 26, as viewed in FIG. 1.

The coil 34 is connected by one lead 36 to the heater lead 22 and by a second lead 38 to the other heater lead 24 so that the coil 34 is in parallel with the heater element 14. It is to be understood that the coil 34 and the heater element 14 can also be connected in series, if desired. Also, in the illustrated wiring arrangement, the snap action switch 16 is arranged so that when it is open, both of the power conductors 18 are open. This is a safe arrangement which avoids having a continuous voltage between the heater element 14 and ground even when the heater element 14 is not energized. A rheostat 40 is illustrated as being connected in series with the heater coil 34 to enable factory adjustment of the heat output of the coil 34.

A lever 42 which is temperature responsive and which is mounted in the room or other space in which the heat is to be controlled by the heater element 14, is adjustably mounted at one end 44 so that the position of the opposite end 46 of the lever 42 relative to the switch actuating member 26, at a given temperature, can be adjusted. The lever 42 is illustrated as being attached at its end 44 to the shaft 48 for a movable member 50 which indicates room temperature setting by means of a pointer 52. In the illustrated embodiment of the invention, the lever 42 is formed of thermostatic bimetal having a high expansion side H and a low expansion side L so that as the temperature in the room in which the lever 42 is mounted decreases, the end 46 of th lever 42 will deflect in a direction toward the actuating member 26, and as the temperature in the room is increased, the lever end 46 will deflect in a direction away from the switch actuating member 26. An insulating link 54 extends between the end 46 of lever 42 and the end 32 of element 28. The element 28 is located so that the end 32 can engage the switch actuating member 26. When the element 28 is moved upwardly, the end 32 of element 28 moves switch actuating member 26 to the switch "on" position and engages a fixed stop 35 to prevent element 28 from damaging switch 16.

In the operation of the heater control 10 of this invention, the lever 44 is preferably mounted on or partially inside an outer wall of the room which is to be heat controlled. The member 50 is set to indicate at the pointer 52 a preselected temperature. At lower temeprature settings of pointer 52, the lever 42 is inclined downwardly relative to the position illustrated in FIG. 1 so that the end 46 thereof is farther from the switch actuating member 26, at a given temperature, than it is in the illustrated position. When the heat loss from the room is such that the temperature of the lever 42 is below a temperature at which it exerts no force on actuating member 26, the end 46 deflects upwardly as viewed in FIG. 1 to move the force transmitting member or link 54 upwardly to in turn force the end 32 of the element 28 upwardly and move the switch actuating member 26 upwardly to the "on" position therefor. This position of the switch 16 results in electrical connection of the conductors 18 to the leads 22 and 24 to thereby energize the heater element 14 and the heater coil 34. Heat is then supplied by heater 12 to the room in which lever 42 is located. Energizing of the coil 34 results in heating of the element 28 to in turn cause the end 32 thereof to move downwardly as viewed in FIG. 1 and allow the switch actuating member 26 to return to the "off" position. The time during which switch 16 is closed is determined by the magnitude of the force created by lever 42 on switch member 26 (which is proportional to room temperature) and the thermal inertia of element 28 and coil 34 (which are design parameters).

When switch 16 is "off," heat from the element 14 to the room in which the lever 42 is located is discontinued, and the heating of the element 28 by the coil 34 is likewise discontinued. In the event the ambient temperature in the room in which the lever 42 is located is still below the preset temperature, as soon as the element 28 has cooled, the lever 42 will again force the switch actuating member 26 to the switch "on" position. This cycle is continuously repeated so that the preset room temperature is closely maintained. This condition is illustrated by the graph in FIG. 2 which shows that as the heater 14 is energized, the current supplied to the element 14 immediately rises to the level indicated at 58, is held at this level for a short time, and then drops to zero as soon as the element 28 has been heated. In a short time the current again rises to level 58, with this cycle repeating substantially continuously. As the room temperature falls below the set temperature, indicated in FIG. 2, the heater 14 immediately raises the temperature so that the room temperature fluctuates imperceptibly above and below the set temperature, the element 14 never becoming cold in cases of significant heat loss rate. The apparatus 10 thus senses the heat loss rate from the room and provides for a heat generation rate by the heater element 14 which is equal to the heat loss rate. For this reason, the apparatus 10 is advantageously mounted on or inside an outside wall of the room where such heat loss takes place and is, therefore, most readily sensed.

Figure 2:
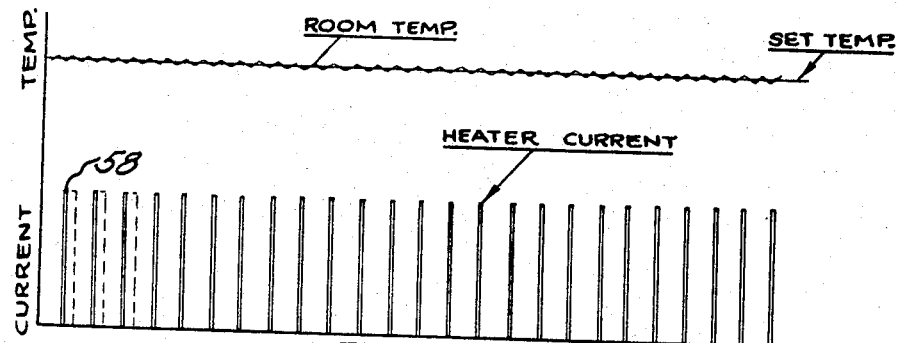
FIGURE 2 is a graph illustrating the relationship between time on one axis and current and temperature on the other axis in the operation of the control apparatus of this invention.
Figure 3:
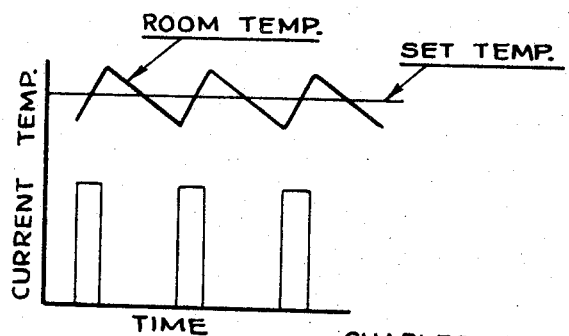
FIGURE 3 is a graph, similar to FIGURE 2, illustrating the relationships between time, temperature and current in conventional thermostats.

The operation of the apparatus 10 is readily contrasted with a conventional thermostat heater control operation by comparing FIG. 2 with FIG. 3 which graphically illustrates conventional thermostat operation. As shown in FIG. 3, heater current reaches a value 60 and is maintained at that value for a substantial period of time before dropping to zero for an extended time period, thereby allowing the element 14 to become cold. In contrast, and as shown in FIG. 2, in applicant's apparatus 10 the element 14 is cooled only for small periods of time so that it may never become cold, depending upon the heat loss rate. Also, as shown in FIG. 3, the room temperature in a conventional thermostat operation varies between the lower and upper limits of thermostat sensitivity, indicated at 62 and 64, respectively, with this temperature variation extending over considerable periods of time. With the apparatus of this invention, the room temperature varies only imperceptibly as shown in FIG. 2. In case the heat loss rate is higher than shown in FIG. 2, the average temperature of the heater element 14 is kept at a higher value to maintain a constant room temperature. This condition is illustrated in broken lines in FIG. 2 which illustrate that the heater current is on each time for a longer period. It is to be appreciated that FIGS. 2 and 3 illustrate constant heat loss rate conditions over a relatively small time period, which conditions are subject to some variation in actual practice.

From the above description, it is seen that this invention provides apparatus 10 which is capable of maintaining an enclosure at a predetermined set temperature with very small variations from the set temperature. This is accomplished by the cooperative relationship of the bimetal element 28 and the temperature responsive lever 42 so as to sense heat loss rate and provide for a corresponding heat generation rate. The switch 16 is of snap action type to avoid arcing of the contacts, but it is to be understood that in its broader aspects this invention is of a scope to include other switches.

It will be understood that the electric heater control apparatus which is herein disclosed and described is presented for purposes of explanation and illustration and is not intended to indicate limits of the invention, the scope of which is defined by the following claims.

What is claimed is:

1. Apparatus adapted to sense the heat loss in a localized region and to control accordingly the heat supplied to said region by a heater in order to maintain a constant temperature in said region, said apparatus comprising:

a two position electrical switch adapted for connection between a source of electrical energy and said heater, said switch having on and off electric states, said switch having a lever which when moved into one position places the switch in the on state and when moved into a second position places the switch in the off state, said lever being normally biased into the second position;

a first elongated thermostatic bimetal member pivotally secured at one end and having its other end disposed adjacent said lever, said first member, when heated, curving in a direction at which its other end moves away from said lever, and, when cooled, curving in opposite direction to cause its other end to contact said lever and move same into its first position;

a second elongated thermostatic bimetal member pivotally secured at one end and having its other end disposed adjacent the other end of the first member, the other end of the first member being disposed between the other end of the second member and said switch lever, said second member, when heated, curving in a direction at which its other end moves away from said lever and when cooled, curving in opposite direction to cause its other end to move toward said lever;

a linkage interconnecting the said other ends of said first and second members; and heater means connected in circuit with said switch and disposed adjacent said first member to heat said first member when the switch is on.

2. Apparatus as set forth in claim 1 wherein said first member responds to heat supplied by said means but does not respond to the ambient temperature, and said second member responds to ambient temperature and does not respond to heat supplied by said means.

3. Apparatus as set forth in claim 2 wherein said linkage is thermally insulated to prevent heat from said means from being transferred to said second member.

4. Apparatus as set forth in claim 3 wherein said means is a heating coil through which said first member extends.

5. Apparatus as set forth in claim 4 wherein the said one end of the second member is attached to a shaft for a third movable member having a pointer which indicates an ambient temperature setting.

6. Apparatus as set forth in claim 5 further including a stop to limit upward travel of the other end of said first member to avoid damage to said switch.

7. Apparatus as set forth in claim 6 wherein said heater and said element are connected in parallel with each other and in series with said switch.

References Cited
UNITED STATES PATENTS

| | | | |
|---|---|---|---|
| 2,446,474 | 8/1948 | Harrold | 200—113.11 |
| 2,521,120 | 9/1950 | Harrold | 200—122 |
| 2,612,543 | 9/1952 | Alexander | 200—122 |
| 2,629,034 | 2/1953 | Harrold | 200—122 |
| 2,754,392 | 7/1956 | Benedik | 200—122 |
| 2,835,766 | 5/1958 | Few | 200—122.01 |
| 2,032,041 | 2/1936 | Beck | 200—81.5 X |
| 2,448,289 | 8/1948 | Anderson | 219—511 |
| 2,475,291 | 7/1949 | Osterheld | 219—511 X |
| 2,733,315 | 1/1956 | Richardson | 200—138 |
| 3,238,335 | 3/1966 | Randolph et al. | 200—122 |
| 3,077,529 | 2/1963 | Schaner | 200—122 X |

BERNARD A. GILHEAMY, *Primary Examiner.*

R. COHRS, *Assistant Examiner.*

U.S. Cl. X.R.

337—53